Patented Dec. 10, 1946

2,412,469

UNITED STATES PATENT OFFICE 2,412,469

TRIETHYLENE GLYCOL DIHEPTOATE

Leonard Nicholl, Nyack, and William P. Bitler, Haverstraw, N. Y., assignors to Kay-Fries Chemicals, Inc., West Haverstraw, N. Y., a corporation of New York No Drawing. Application November 16, 1943, Serial No. 510,570

1 Claim. (Cl. 260—488)

This invention relates to plasticizers for synthetic rubber, and to the compounds and methods of producing same.

In the utilization of the newly developed synthetic rubbers or elastomers, it has been found necessary to incorporate plasticizing agents therewith in order to improve their workability and wearing qualities. As there are a number of groups of compounds utilized as synthetic rubbers, there are plasticizing problems inherently different for each group of compounds.

The improvements of the present application are directed to the use of plasticizers particularly suited for work with butadiene-acrylonitrile copolymers and comprising heptaldehyde products, and particularly triethylene glycol diheptoate and diheptyl phthalate. These two novel compounds may be incorporated in synthetic rubbers of the butadiene-acrylonitrile, and in amounts varying from substantially 20 to 25% of the elastomers. These plasticizers have been found, on tests, to give a desirable "low temperature flexibility" to the elastomers under consideration.

The plasticizers are themselves novel compounds which have not been described in the literature so far as is now known. The two compounds are derived from a series of reactions which are interdependent, and which comprise (1) condensation of heptaldehyde to heptyl heptoate; (2) reaction of the heptyl heptoate produced under (1) with triethylene glycol and heptanol to form triethylene glycol diheptoate; (3) recovery of excess heptanol and reaction of same with phthalic anhydride to produce diheptyl phthalate.

In the carrying out of the reactions indicated generally above, special results are obtained by the use of aluminum alkoxides as catalysts. By the use of the processes herein and using dry aluminum alkoxides as catalysts, it has been found possible to treat crude heptaldehyde (oenanthal), containing 75 to 90% of heptaldehyde, when the crude aldehyde, which normally contains higher organic acids, acrolein and water, is freed from acrolein and water. The crude heptaldehyde, which is usually derived from castor oil, is distilled to remove the acrolein, and then the water, leaving the heptaldehyde and the higher organic acids as a residue. By this treatment, and with this discovery, the preparation of a pure heptaldehyde as a starting material for the condensation is not required. It is to be noted that in order to obtain maximum yields from the pure heptaldehyde that the acrolein must be removed or it will interfere with the main condensation reaction and lower the yield of heptyl heptoate. The water present in the crude heptaldehyde is also required to be removed because it would hydrolyze the aluminum alkoxide catalysts, and thereby prevent the condensation reaction from taking place, or it would cause the yield of heptyl heptoate to be lowered to a very considerable extent.

The several processes involved in the preparation of the necessary reagents and the carrying out of the condensation reactions, will now be described:

Stripping of crude heptaldehyde

Crude heptaldehyde is stripped to remove acrolein and water in the following manner:

3,080 lbs. of crude heptaldehyde are loaded into a column still, together with 15 lbs. of tartaric acid. The distillation is conducted with a liquid temperature of 110° C. and a vapor temperature of 80° C., the distillation at the end being carried out under a vacuum of 180 mm. to 85 mm. The distillant or still residue is cooled to room temperature and drawn off into dry containers which are protected from ingress of moisture. The yield should be approximately 2860 lbs. of stripped crude heptaldehyde of 88% strength equivalent to approximately 2500 lbs. of 100% heptaldehyde.

Preparation of catalysts

As the aluminum alkoxide catalyst, either aluminum butoxide or aluminum heptoxide may be used. These catalysts are prepared as follows:

*Aluminum butoxide.*—A thoroughly dried still is loaded with a charge comprising 225 lbs. of butanol, 28.6 lbs. of aluminum, and 0.28 lbs. of iodine. The still is provided with a moisture trap, and the condenser column is open to the air. The reaction mixture is heated, while stirring, until the reaction becomes vigorous and refluxing takes place. If necessary, the reaction may be controlled by cooling the still. When the reaction has been brought under control, an additional 230 lbs. of butanol is added, as rapidly as possible, while still controlling the reaction with cooling water. After all the butanol has been added, which will take approximately one hour, and the reaction has subsided, the still is heated for one hour longer at 90 to 100° C. to complete the reaction. This will give a solution of aluminum butoxide in an excess of butanol.

*Aluminum heptoxide.*—Into a thoroughly dry still there is loaded a charge comprising 715 lbs. heptanol, 28.6 lbs. of aluminum, and 4.5 oz. of iodine. The still is closed, the condenser being left open, and provided with a moisture trap. The reaction mixture is refluxed at 160° C. (column temperature) for 1½ hours, with good agitation. At the end of the reaction time, the reaction mixture is allowed to cool to room temperature.

In addition to the specific aluminum alkoxides disclosed, it has also been found that other aluminum alkoxides and other alcohols will work. Thus, aluminum ethoxide in an excess of ethanol gives desirable results as a catalytic mixture.

Condensation of stripped, crude heptaldehyde

*Using aluminum butoxide as a catalyst.*—2860 lbs. of stripped, crude heptaldehyde are added to the aluminum butoxide catalyst. The mixture is well agitated over a period of one hour, and the temperature is maintained at 26–30° C., by the use of cooling water on the still jacket, and by controlling the rate of addition of the crude heptaldehyde to the still. When the heptaldehyde has been completely added, the reaction is continued for another four hours at the same temperature. The reaction mixture is then fractionated according to the following schedule:

[Weight of batch 3,240 g.]

| Fraction | Liq. temp., °C. | Vap. temp., °C. | Press., mm. | Wt. of fraction | Remarks |
|---|---|---|---|---|---|
| | | | | Grams | |
| 1 | 130–106 | 55– 50 | 50–20 | 118 | Butanol. |
| 2 | 106–116 | 51– 82 | 20 | 91 | Int. cut. |
| 3 | 116–136 | 82– 91 | 20 | 354 | Heptanol. |
| 4 | 136–153 | 91–120 | 20 | | |
| 5 | 153–172 | 120–153 | 20–17 | 600 | Butyl heptoate. |
| 6 | 172–172 | 153–153 | 17 | | |
| 7 | 172–200 | 153–160 | 17 | 1,530 | Heptyl heptoate. |
| 8 | | | | 550 | Residue. |

The reaction should be carried out within the temperatures stated, as it has been found that, at higher temperatures, such as 40° C., the yield is cut by approximately 10%. The total time of reaction should approximate five hours, although it may be extended to fourteen hours, or more, providing the temperature limits are not exceeded. A second condensation can be run in the same still, merely requiring the draining off of the used catalyst and replenishment with fresh catalyst.

*Using aluminum heptoxide as a catalyst.*—This reaction is conducted under substantially the same conditions and limitations as applied to the use of aluminum butoxide. The stripped, crude heptaldehyde (2860 lbs.) is added to the aluminum heptoxide catalyst and the mixture well stirred. The reaction mixture is maintained at 26–30° C. by cooling the still, and by controlling the rate of addition of the heptaldehyde. When all the heptaldehyde has been added, the reaction is continued, at the same temperature, for a time period of four hours. The reaction mixture is then fractionated according to the following data:

Preparation of triethylene glycol diheptoate
(B. P. ca. 250–255° C. at 2 mm.)

In the preparation of this compound there is a straight ester exchange, as opposed to a new reaction between heptyl heptoate (or butyl heptoate and heptyl heptoate) and triethylene glycol, with sodium ethoxide being used as a catalyst. There are two methods of carrying out this reaction depending on whether heptyl heptoate is used, or the mixture of butyl heptoate and heptyl heptoate. These separate reactions will now be described:

*Using a mixture of butyl heptoate and heptyl heptoate.*—Into a thoroughly dry still there is charged 768 lbs. of triethylene glycol and 370 lbs. of sodium ethoxide in anhydrous ethyl alcohol solution (containing 6.5% sodium). The reaction mixture is heated to 100° C. and the alcohol liberated is distilled off to a liquid temperature of 110° C. To remove the residual alcohol a vacuum of 35 mm. may be pulled on the still. To the dealcoholized reaction mixture there is charged a mixture of 1560 lbs. of heptyl heptoate and 615 lbs. of butyl heptoate. The temperature of the reaction mixture is raised to 132–135° C. under a vacuum of 60–65 mm. Butanol distills over at a still-head vapor temperature of 60–65° C. The liquid temperature will have to be raised to 145°–155° C. in order to remove the residual butanol. Thereafter the vacuum is increased slowly to 10 mm., and the temperature of the reaction mixture reduced to 125–130° C. The heptanol set free in the reaction will start to distill over at a vapor temperature of approximately 78–79° C. The vacuum distillation of heptanol is continued while gradually raising the liquid temperature to a final value of approximately 220° C. After removal of the heptanol the reaction mixture is allowed to cool, and is then washed with ⅛ to ¼ of its volume of 1–5% sulphuric acid and at a temperature of 60–70° C., until it is neutral or only slightly acid. The washed oil is permanganate treated in dilute acid solution, using 1% of the weight of the reaction mixture of permanganate in a 2% solution. Upon completion of this treatment a slight excess of 50% sodium bisulphite solution is added to decolorize the reaction mixture. The aqueous layer is separated from the oily layer and washed with water until free from any soluble manganese salt. The treated oil is further treated with ½% Nuchar (decolorizing carbon), blown dry, and filtered.

*Using heptyl heptoate.*—A charge of 1230 lbs. triethyene glycol and 570 lbs. sodium ethoxide in absolute alcohol solution (containing 6.5% sodium) are loaded into a thoroughly dry still. The reaction mixture is heated to 100° C., and ethanol distilled off to a liquid temperature of 110° C. A final vacuum of 35 mm. is usually required to be pulled on the still in order to get the last traces of alcohol over. To the dealco-

[Weight of batch 340 g.]

| Fraction | Liq. temp., °C. | Vap. temp., °C. | Press., mm. | Wt. of fraction | Wt. low boil frac. | Wt. heptanol | Wt. heptyl heptoate | Remarks |
|---|---|---|---|---|---|---|---|---|
| 1 | 123 | 93 | 35 | 13.7 | 13.7 | | | Impurities in crude heptaldehyde. |
| 2 | 123–162 | 94–86 | 35 | 55 | | 55 | | Heptanol. |
| 3 | 162–163 | 86–156 | 20 | 7.5 | | 4.5 | 3.0 | Int. cut. |
| 4 | 162–163 | 156–136 | 20–10 | 219 | | | 219.0 | Heptyl heptoate. |
| 5 | | 250 | 136 | 10 | 12.0 | | | 12.0 | End cut heptyl heptoate. |
| 6 | | | | 33.2 | | | | Residue. | holized reaction mixture in the still, there is added 2735 lbs. of heptyl heptoate. The temperature of the reaction mixture is raised to 100° C. and a vacuum of 35 mm. is pulled. A small amount of ethanol may be drawn off through the column at a liquid temperature of 120° C. and a vapor temperature of 78° C. Thereafter the distillation is continued to a final liquid temperature of approximately 220° C. to recover the liberated heptanol. The residual reaction mixture is then washed, permanganate treated, carbon treated, and blown dry in same manner as indicated immediately above.

Preparation of diheptyl phthalate

In this process phthalic anhydride is esterified with heptanol in the following manner. Into a still there is charged 3380 lbs. of heptanol, 2160 lbs. of phthalic anhydride and 27.7 lbs. of concentrated sulphuric acid. The reaction mixture is raised to a temperature of 125–130° C., when water should begin to distill over, at normal pressure. The reaction mixture is maintained at substantially constant temperature, and a vacuum, up to 25 mm., is applied, in order to maintain the distillation. Any heptanol distilled over with the water is separated and returned to the reaction mixture, so that the amount of heptanol in the reaction mixture is maintained substantially constant. This is continued until the reaction is completed and no more water distilled over. The completion of the reaction is tested so that one cc. of the reaction mixture is equivalent to approximately 3 cc. of N/10 NaOH. When the reaction mixture has dropped to a temperature of 60–70° C., it is washed with dilute (5–10%) sodium carbonate solution, until slightly alkaline. The mixture is then permanganate treated with 1/10 of its weight of potassium permanganate, in a 2% solution, under slightly acid conditions. Manganese dioxide is precipitated out, and is dissolved in a slight excess of 35% sodium bisulphite solution. The washed water layer is separated, and the reacted mixture again washed with water, until free from soluble manganese salt. The washed product is then treated with decolorizing carbon, blown dry, and filtered.

The compounds, triethylene glycol diheptoate and diheptyl phthalate are novel and useful and are prepared from an originally crude product, namely, heptaldehyde, which is stripped to remove water and acrolein, both of which compounds have a deleterious effect on the condensation reactions here involved. Ordinarily, in making a series of condensations, heptanol will not be available to make the aluminum heptoxide catalyst. However, heptanol is produced in the triethylene glycol diheptoate reaction. Consequently butanol must be used for the first condensation (Equation 2) and the heptanol formed in this reaction may be used to make the desired catalyst. When butanol is used, a mixture of butyl heptoate and heptyl heptoate is formed, instead of the plain heptyl heptoate, which is formed when heptanol alone is used to make the catalyst. Where the mixed heptoates are used, there is produced a mixture of heptanol and butanol, which as shown above, are readily separated and recovered by fractionation.

The reactions involved in the above described processes may be graphically illustrated by the following equations:

Condensation of heptaldehyde

With aluminum heptoxide as catalyst:

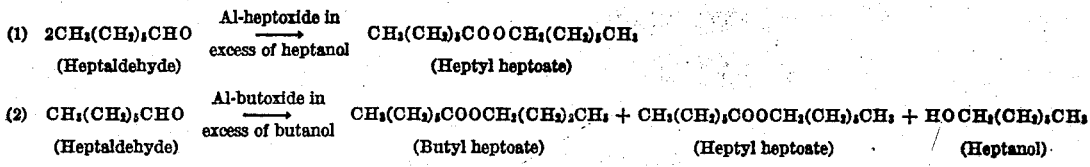

Preparation of Triethylene glycol diheptoate by ester exchange

With heptyl heptoate:

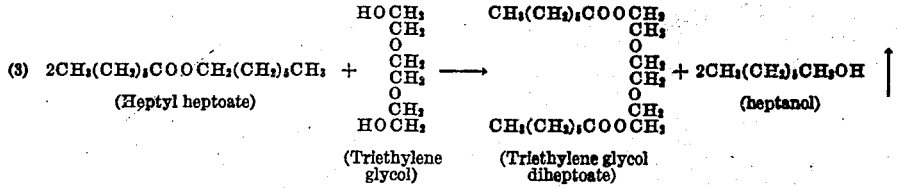

With butyl heptoate:

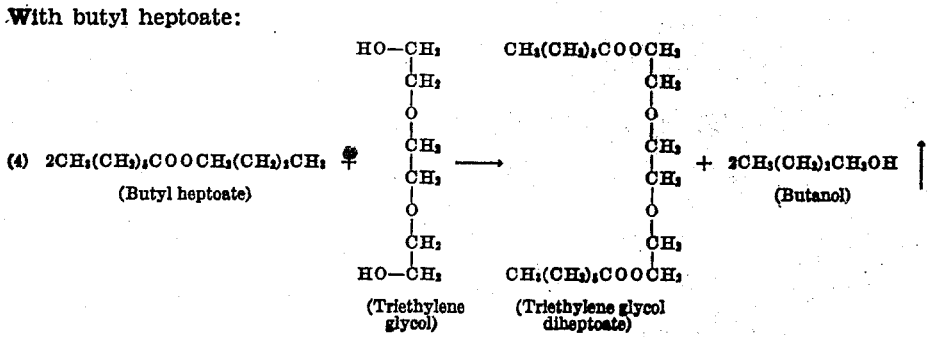

With mixed butyl heptoate and heptyl heptoate:

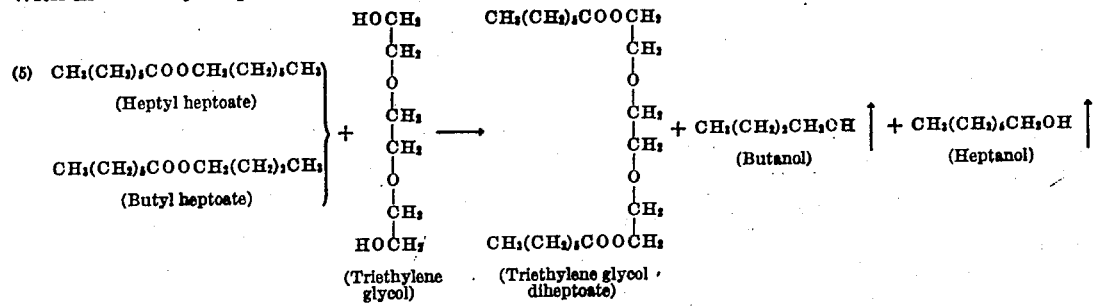

*Preparation of diheptyl phthalate*

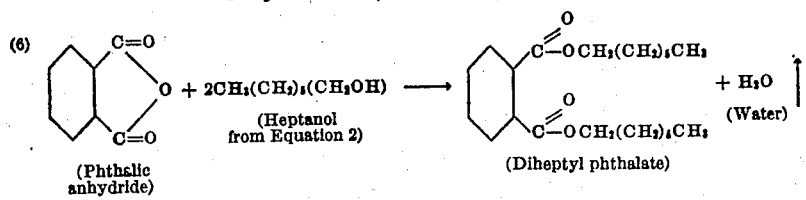

It will now be appreciated that there has been provided novel plasticizers for synthetic elastomers, and particularly derivatives of butadiene-acrylonitrile type in which desirable "low temperature flexibility" is imparted to the elastomers. It will also be appreciated that there has been provided novel method of preparing the plasticizers in which a crude product is stripped to remove interfering components and reactions carried out in the presence of non-interfering residues.

What is claimed is:

Triethylene glycol diheptoate.

LEONARD NICHOLL.
WILLIAM P. BITLER.